United States Patent [19]

Choate

[11] Patent Number: 5,678,874
[45] Date of Patent: Oct. 21, 1997

[54] PRISONER CONTAINMENT AND TRANSPORTATION UNIT

[76] Inventor: Ronny D. Choate, 4024 Fiesta Dr., Hobbs, N. Mex. 88240

[21] Appl. No.: 621,067

[22] Filed: Mar. 22, 1996

[51] Int. Cl.⁶ .................................................. B60P 3/00
[52] U.S. Cl. ........................ 296/24.1; 296/164; 52/106
[58] Field of Search ........................... 296/24.1, 164, 296/100, 39.1; 52/106; 119/15

[56] References Cited

U.S. PATENT DOCUMENTS

| | | | |
|---|---|---|---|
| 2,559,029 | 7/1951 | Randolph | 296/24.1 |
| 3,547,481 | 12/1970 | Gleason | 296/164 |
| 3,868,060 | 2/1975 | Mitchell | 296/164 X |
| 4,159,141 | 6/1979 | Dirck | 296/24.1 |
| 4,470,228 | 9/1984 | Dirck | 296/24.1 |
| 5,080,416 | 1/1992 | Dirck | 296/24.1 |
| 5,083,833 | 1/1992 | Herrmeyer | 296/164 X |

*Primary Examiner*—Joseph D. Pape
*Attorney, Agent, or Firm*—Robert W. Becker & Associates

[57] ABSTRACT

A prisoner containment and transportation unit is provided for use with a pick-up truck and a pick-up shell that is provided for the truck. The unit is a one-piece or two-piece insert that is accommodated in a space defined by a bed of the truck and the shell. A door closes off the open rear end of the unit and provides access to the unit. For rigidity and support, a frame is disposed between the shell and the unit. The unit has an integrally molded bench seat and seat back that extend in the longitudinal direction of the truck.

15 Claims, 7 Drawing Sheets

PRISONER CONTAINMENT AND TRANSPORTATION UNIT

BACKGROUND OF THE INVENTION

The present invention relates to a prisoner containment and transportation unit for use with a pick-up truck.

Vehicles, and prisoner transport modules for such vehicles, for example vans, are known. See Dirck, U.S. Pat. Nos. 4,159,141; 4,470,228; and 5,080,416. A removable passenger body for a truck is also known; see U.S. Pat. No. 2,559,029, Randolph. All of the heretofore known vehicles and modules therefor are inconvenient and expensive.

It is therefore an object of the present invention to provide a prisoner containment and transportation unit that is economical and can be used with a pick-up truck such that it provides a safe environment both for the police officers and for the prisoners that are being transported.

BRIEF DESCRIPTION OF THE DRAWINGS

This object and other objects and advantages of the present invention, will appear more clearly from the following specification in conjunction with the accompanying schematic drawings, in which.

SUMMARY OF THE INVENTION

Figure 1:
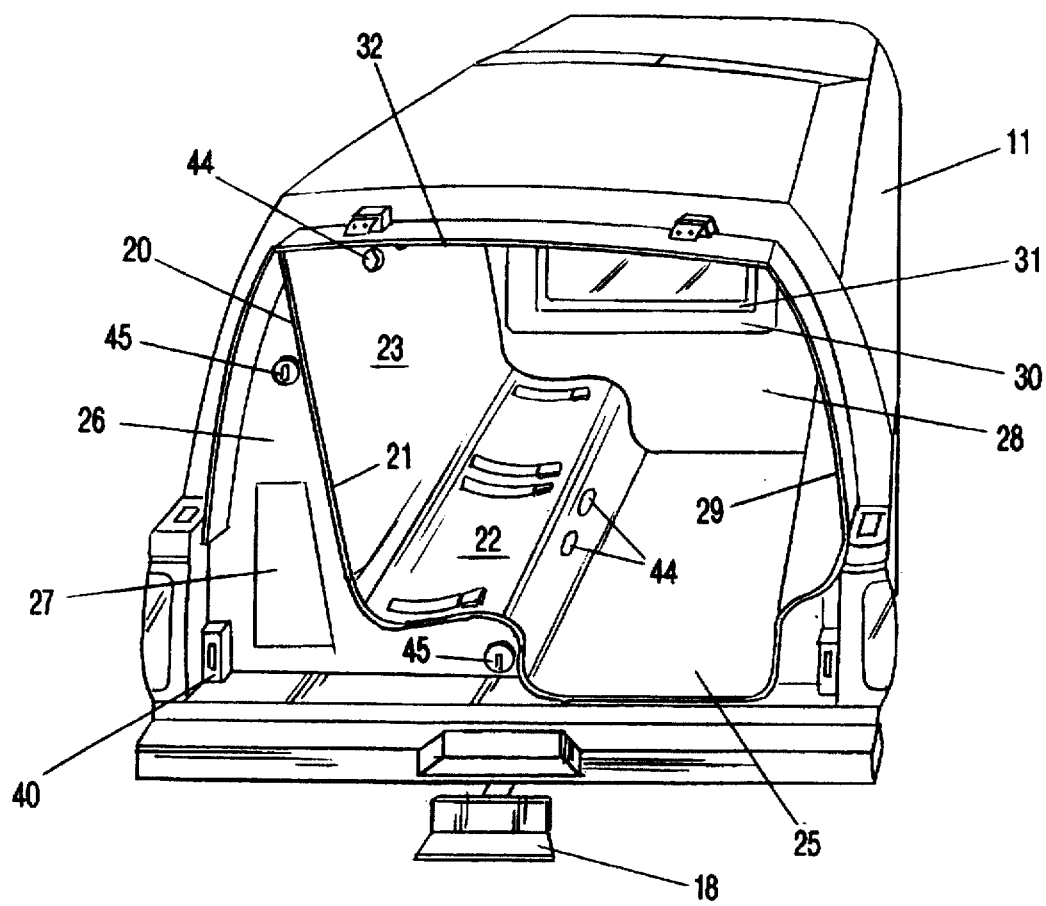
FIG. 1 shows one exemplary embodiment of the inventive prisoner containment and transportation unit as it is contained in a shell disposed on a pick-up truck, with the rear door removed.

The present invention is characterized by a prisoner containment and transportation unit for a pick-up truck and a pick-up shell that is provided therefor. The prisoner containment and transportation unit is a one-piece or two-piece insert that is accommodated in a space defined by a bed of the truck and the shell. A door is provided at the rear, open end of the unit to provide access to the unit.

A support frame is disposed between the shell and the prisoner containment and transportation unit, with the access door being a hatchback door that is hingedly supported on the frame. The prisoner containment and transportation unit is a slide-in unit, and includes an integrally molded bench seat and seat back that extend in a longitudinal direction of the truck. Support means can be secured to the bed of the truck to support the bench seat.

The inventive prisoner containment and transportation unit expediently includes a front wall that adjoins an end of the bench seat and the seat back and faces a cab of the truck, with the front wall having a window to allow visual contact into the unit from the truck cab. The unit furthermore comprises a floor that rests upon the bed of the truck and adjoins the bench seat. A side wall extends in the longitudinal direction of the truck and adjoins both the floor and the top wall, with a top integrally connecting the side wall, the front wall, and the seat back.

Pursuant to one preferred specific embodiment of the present invention, the prisoner containment and transportation unit is a one-piece molded plastic insert that is comprised of the floor, the bench seat, the seat back, the front wall, the side wall, and the top, with the unit being open to the rear and when it is accommodated in the space defined by the truck bed and the shell is adapted to be closed off by the door. An equipment compartment can be disposed between the cab of the truck and the front wall of the unit. Furthermore, electromagnetic lock means can be disposed between the hatchback door and the prisoner containment and transportation unit.

The prisoner containment and transportation unit can also be a two-piece molded plastic insert comprised of a top portion and a bottom portion that are adapted to be connected to one another. A separate heating and ventilation system can be provided just for the unit. Such a heating and ventilation system can have ductwork that communicates with the unit, wherein pursuant to another specific embodiment of the present invention at least a portion of the ductwork is in the form of contraband trap. In such a case, rake means can be provided to remove contraband from the ductwork.

Further specific features of the present invention will be described in detail subsequently.

DESCRIPTION OF PREFERRED EMBODIMENTS

Referring now to the drawings in detail, for use in combination with a pick-up truck 10 (FIG. 3) and a shell 11 for the pick-up truck, there is provided a unique prisoner containment and transportation unit according to the present invention that is designated generally by the reference numeral 20.

After a support frame 12 (FIG. 3) has been secured to the rear end and/or bed 14 of the truck 10, the shell 11, such as a plastic shell, is placed thereover and secured thereto. The support frame 12 is, for example, a steel rollbar assembly, comprised, for example, of two inch square tubing. A rear hatchback door 15, for example of plastic, is hinged to the support frame 12 as indicated, for example, by the reference numeral 15' in FIG. 4. The hatchback door 15 can be supported, for example, on the hydraulic door support portion 12' of the support frame 12. In addition, the hatchback door 15 is expediently provided with a plastic window 16 (FIG. 5) in order to allow police officers or the like to view the interior of the unit 20 prior to opening the door 15. To facilitate entry into and exit from the unit 20, steps 18 can be provided. Such steps could unfold into position and fold back out of the way, as shown by way of example in FIG. 4. Such steps could either be mounted directly to the truck bumper, or could be inserted into a trailer hitch provided on the truck. Any other suitable step means would of course also be appropriate.

The unitary prisoner containment and transportation unit 20 is slid onto the bed 14 of the truck 10 into the space defined within the support frame 12 that supports the shell 11. The unit 20 is thereupon secured to the support frame 12 in any convenient manner. As can be seen in particular from FIGS. 1, 2 and 6, the prisoner containment and transportation unit 20, which is preferably made of plastic and is expediently of unitary or one-piece construction, comprises a molded bench seat 22 as well as a seat back 23. The bench 22 extends in the longitudinal direction of the vehicle. In one specific embodiment of the inventive unit 20, the seat back 23 is inclined by approximately 10° to the vertical. As can be seen from FIG. 2, the bench 22 can also have a downward slope toward the rear of the bench. In addition, although the bench 20 is essentially self-supporting, the bench 20 can be additionally supported by, for example, support bracket means 24. This support means can also be in the form of a single channel member that extends the full length of the bench 22, or several channel members provided beneath the bench.

A panel 26 can also be provided to close off the space behind the bench and seat back toward the rear of the unit 20. An access door 27 can be provided in the panel 26 to allow access to heating and cooling ducts, heater and air conditioning equipment, etc., and to allow seat belts and other restraining harnesses for the unit to be secured to the support frame 12 or the bed 14 of the truck.

The prisoner containment and transportation unit 20 is provided with an integral front wall 28 that adjoins the front-facing end of the bench seat 22 and the seat back 23. Disposed in the front wall 28 is a window means 30 to allow those seated in the cab of the truck to have visual contact with, for example, prisoners that are seated in the unit 20. The window means 30 can simply be a panel of glass or plastic disposed in the front wall 28, or as in the preferred embodiment can be a recessed window 31. Such a recessed window offers several advantages. First of all, a recessed window provides added rigidity to the unit 20. In addition, with a recessed window 31 the glass or plastic of the window is disposed further away from the prisoners, allowing greater visibility and added security. As can be seen from FIGS. 1 and 6, the recessed sides of the window means 30 preferably slope out from the actual recessed window 31.

The prisoner containment and transportation unit 20, to complete the presently preferred one-piece molded plastic insert nature thereof, further comprises a floor 25 that rests upon the bed 14 of the truck and adjoins the bench seat 22, a side wall 29 that extends in the longitudinal direction of the truck and adjoins both the floor and the front wall 28, and a top 32 that integrally interconnects the side wall 29, the front wall 28, and the seat back 23.

The unit or insert 20 is open to the rear and when disposed on the truck bed 14 in the shell 11 can be closed off by the hatchback door 15. The unit 20 can be sealed relative to the door 15 along the rear edge 21 of the unit 20.

Figure 3:
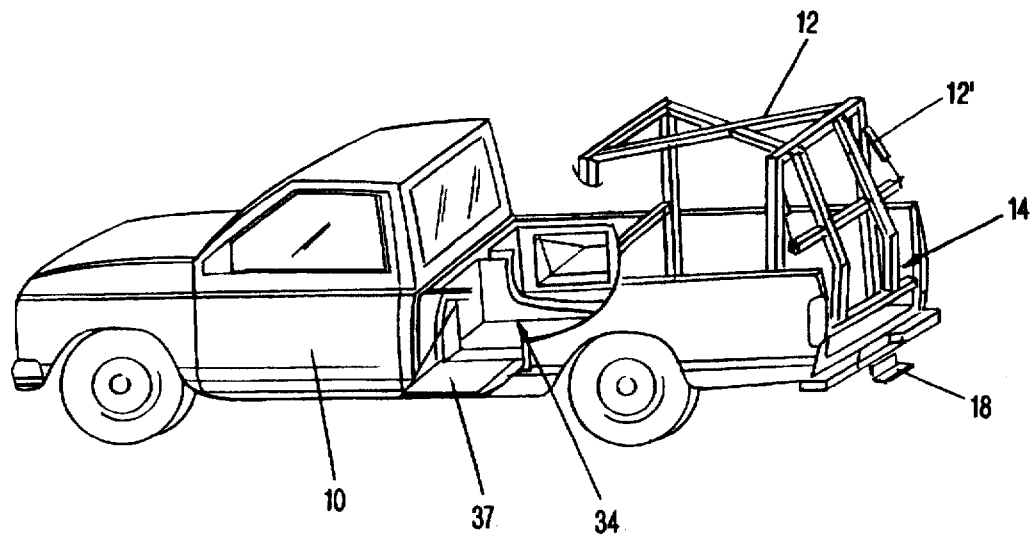
FIG. 3 shows a support frame in the bed of a pick-up truck for the inventive prisoner containment and transportation unit.
Figure 4:
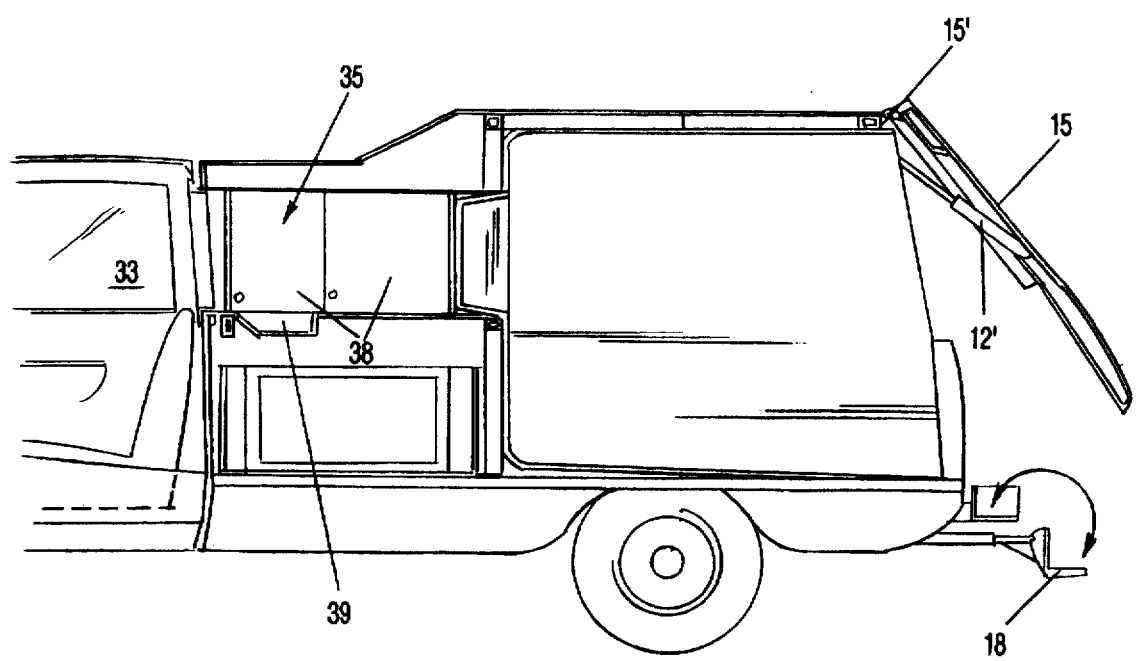
FIG. 4 shows storage compartments and the rear door for the inventive prisoner containment and transportation unit.
Figure 5:
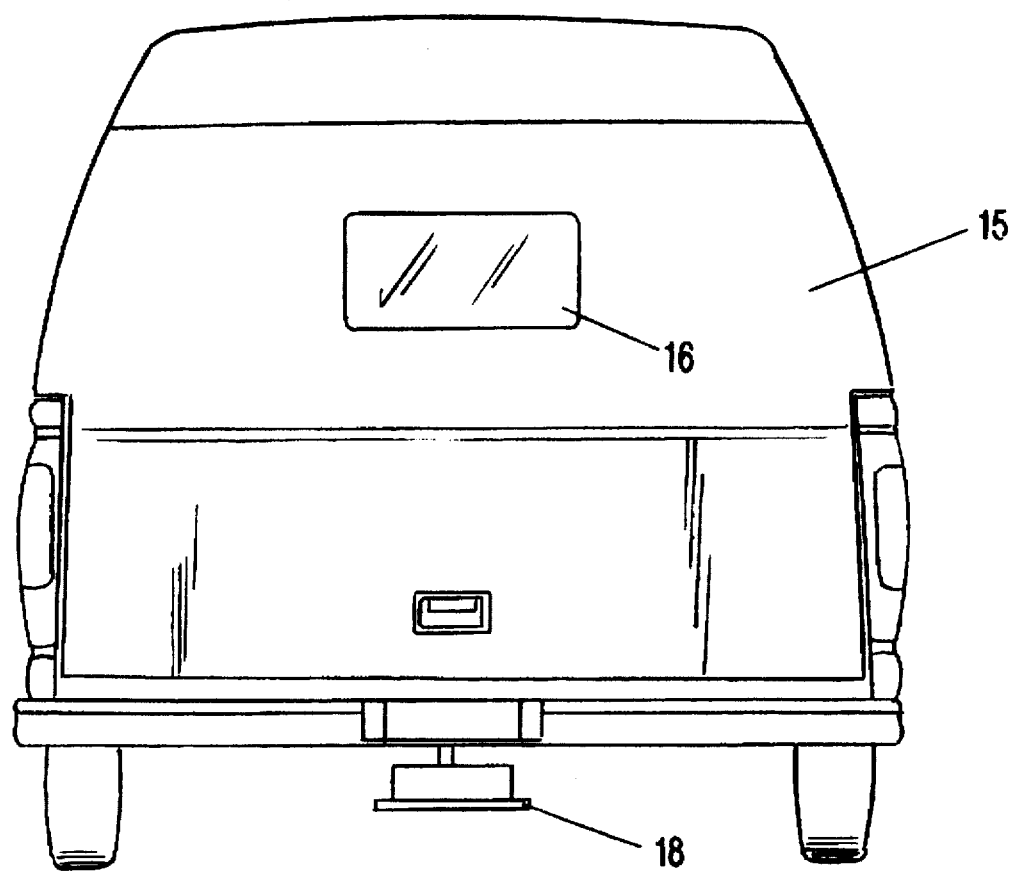
FIG. 5 is a rear view of the rear door covering the inserted prisoner containment and transportation unit.
Figure 6:
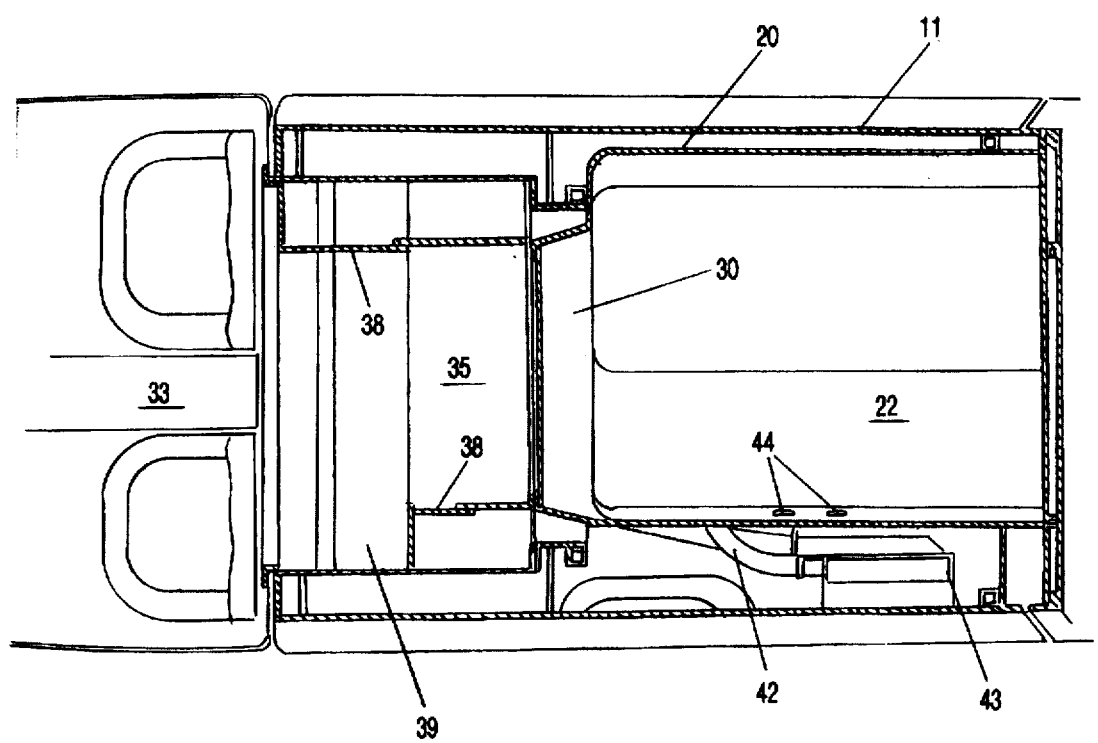
FIG. 6 is a cross-sectional plan view of the inventive prisoner containment and transportation unit as disposed in a truck, with the storage compartments that are disposed between the unit and the cab of the truck.

The prisoner containment and transportation unit 20 could substantially fill the rear end 14 of the truck 10. However, in a preferred embodiment of the present invention, the front wall 28 of the unit 20 can be spaced from the back of the truck cab 33. This space can be used to accommodate tool compartments 34 and/or an equipment compartment 35. The tool compartments, as shown in FIG. 3, can be disposed on the bed 14 of the truck with access to the tool compartments 34 being provided by doors 37 that are provided in the side of the truck. The equipment compartment 35 would be disposed between the window means 30 and the cab 33 (see FIGS. 4 and 6). Since the rear window or windows of the truck cab 33 are removed when the shell 11 is placed on the truck, access to the equipment compartment 35 is directly from the cab 33. Access to storage compartments within the equipment compartment 35 could be by doors 38 provided on either side of the equipment compartment, as well as directly from the cab 33. The equipment compartment 35 could be used, for example, for all sorts of law enforcement equipment, including surveillance equipment. As shown in FIGS. 4 and 6, a recess 39 is expediently provided in the floor of the equipment compartment 35 to receive a shotgun holder that is again readily accessible from the truck cab 33.

Any suitable lock means can be provided to secure the hatchback door 15 in a locked position to close off the open rear end of the prisoner containment and transportation unit 20. However, in a preferred embodiment of the present invention, such lock means can be electromagnetic lock means 40 (FIG. 1) that are controlled from the cab 33 of the truck 10. Such electromagnetic lock means 40 can be disposed between the rear end of the unit 20 and the door 15, and can be secured to the bed 14 of the truck.

Figure 2A:
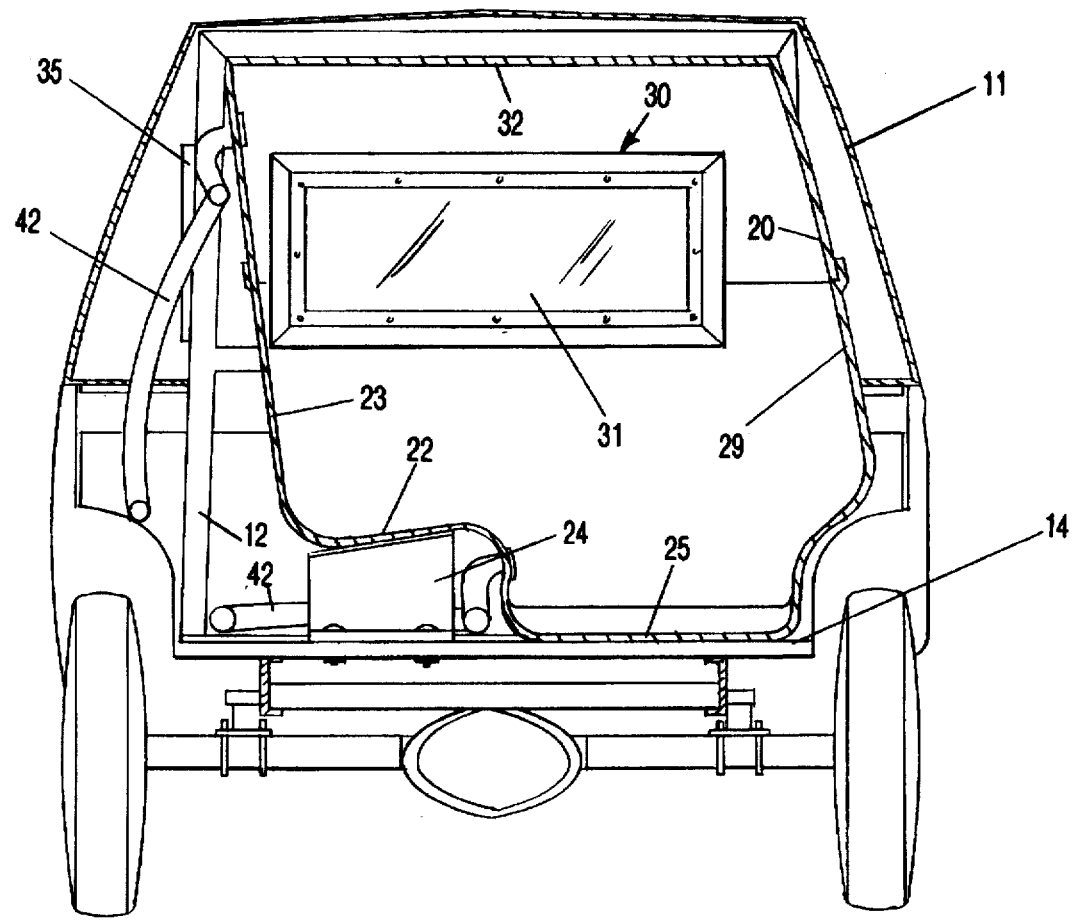
FIG. 2a is a cross-sectional view through the prisoner containment and transportation unit of FIG. 1.
Figure 7:
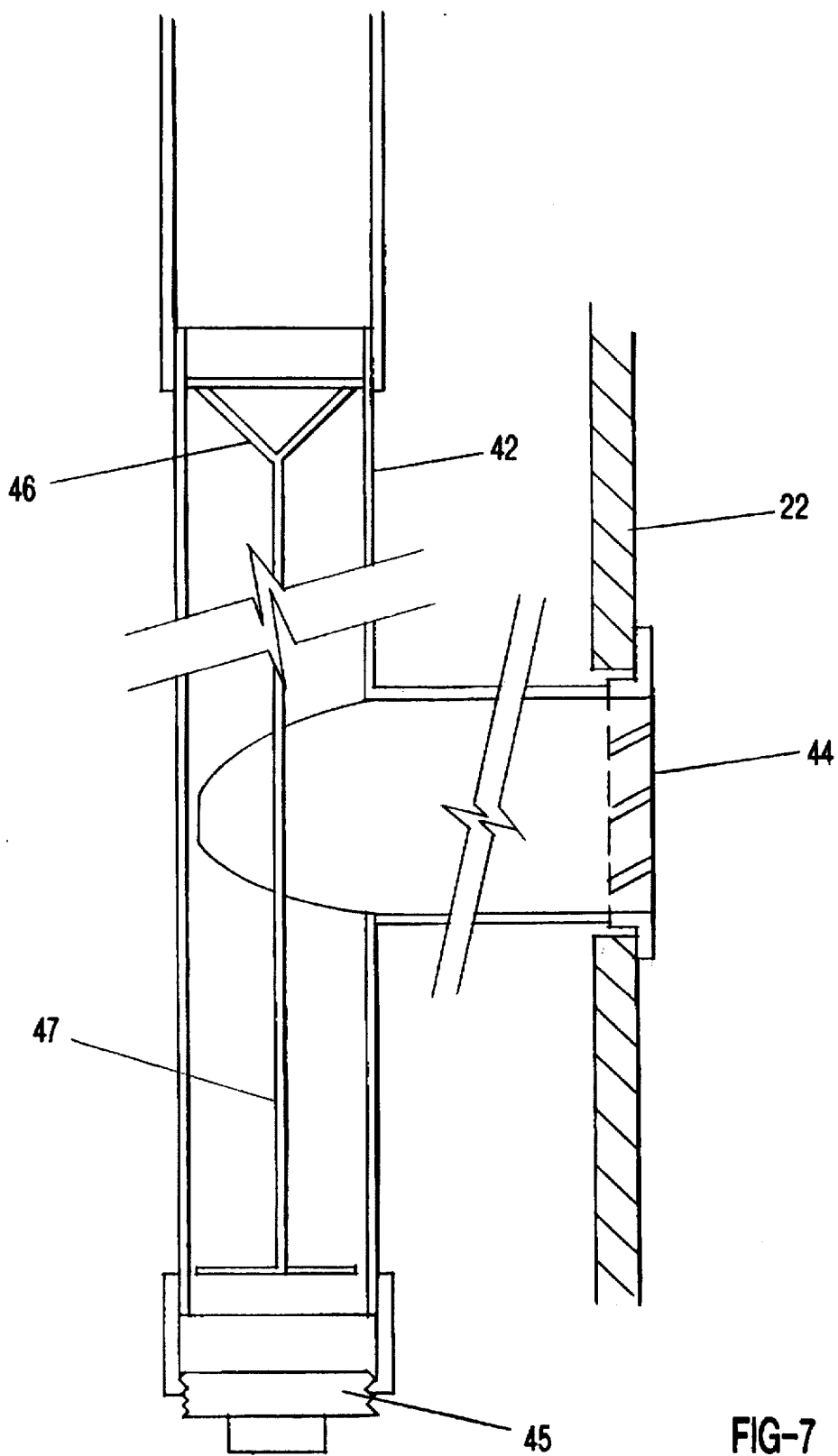
FIG. 7 is an enlarged view showing a contraband trap disposed in duct-work for the inventive prisoner containment and transportation unit.

As indicated previously heating and cooling ducts, as well as appropriate equipment therefor, can be provided between the prisoner containment and transportation unit 20 and the shell 11. Such equipment and ducts are expediently disposed between the shell and the seat back 23 and/or bench 22. FIGS. 1, 2 and 6 show, by way of example only, the placement of such ducts 42, equipment 43, and outlet and/or return air grills 44 relative to the prisoner containment and transportation unit 20. It should be noted that the ventilation and heating system for the prisoner containment and transportation unit 20 is expediently separate from the ventilation and heating system for the truck cab 33. The ductwork 42 provides another opportunity for law enforcement, namely as a contraband trap. In particular, as shown in FIG. 7, those grills 44 located where a prisoner might try to hide contraband, such as the grills 44 that are disposed in the bench 22, could be connected to ducts 42 that can serve as a trap. Such ducts 42 would be provided with an extension that leads to the rear panel 26 and would be closed off by a cap 45 (see also FIG. 1). Disposed in the duct 42 would be a rake 46 to which is connected a pull rod 47 that could be accessed upon removal of the cap 45. A police officer would then merely need to pull on the rod 47 so that the rake 46 would draw any contraband to the rear of the duct 42.

Figure 2B:
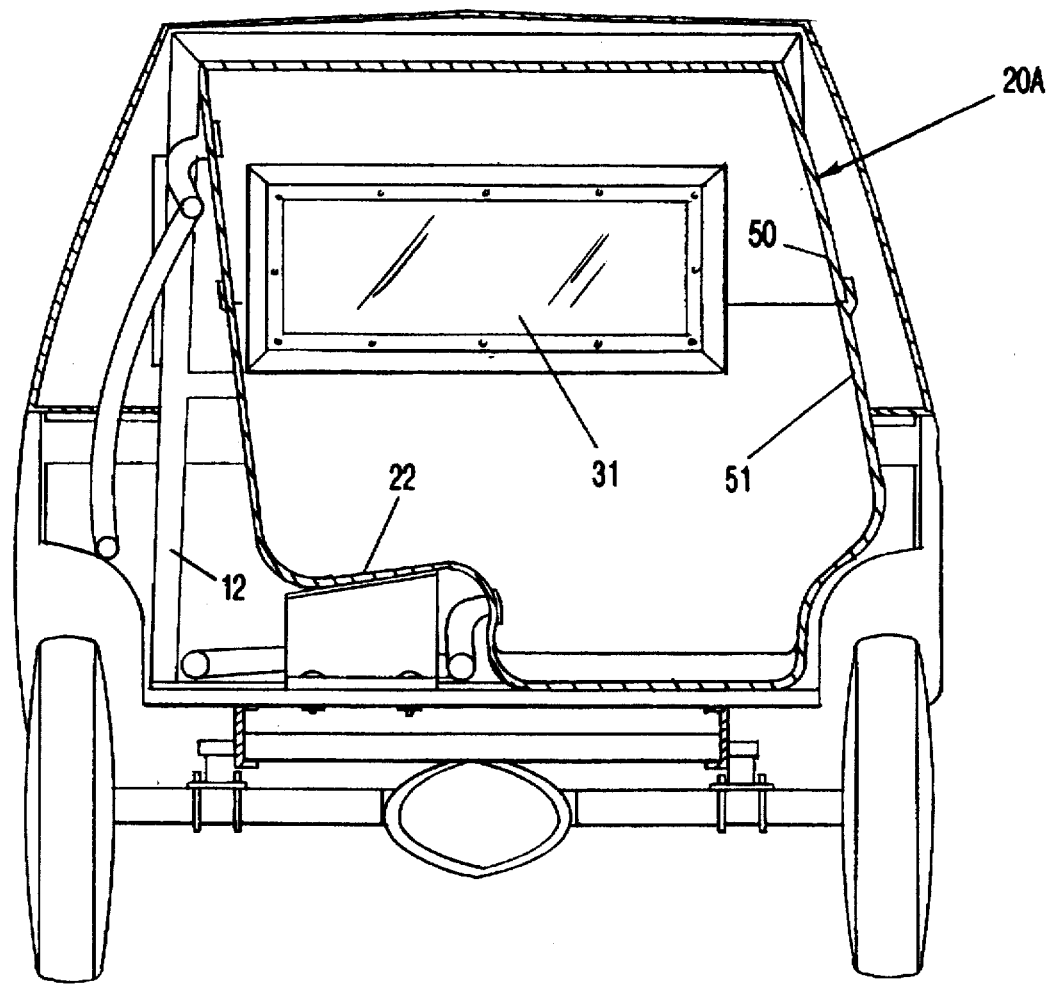
FIG. 2b is a cross-sectional view through a modified, two-piece version of the prisoner containment and transportation unit of FIG. 1.

Although the inventive prisoner containment and transportation unit 20 has been described and shown as expediently being of unitary or one-piece construction, it is also possible to have a multi-piece unit, and in particular a two-piece unit. Such a two-piece unit may be advantageous from a transportation or storage standpoint. Thus, FIG. 2b shows a modified embodiment of a prisoner containment and transportation unit 20A. This modified unit has a top half 50 and a bottom half 51, with the top and bottom halves then being expediently secured together to form a unitary insert.

The present invention is, of course, in no way restricted to the specific disclosure of the specification and drawings, but also encompasses any modifications within the scope of the appended claims.

What I claim is:

1. For a pick-up truck and a pick-up shell provided therefor, a prisoner containment and transportation unit which comprises a one-piece or two-piece insert that is accommodated in a space defined by a bed of said truck and said shell, wherein a door is provided that provides access to said unit.

2. A prisoner containment and transportation unit according to claim 1, which includes a support frame disposed between said shell and said prisoner containment and transportation unit.

3. A prisoner containment and transportation unit according to claim 2, wherein said access door is a hatchback door that is hingedly supported on said support frame.

4. A prisoner containment and transportation unit according to claim 2, wherein said prisoner containment and transportation unit is a slide-in unit.

5. A prisoner containment and transportation unit according to claim 2, wherein said prisoner containment and transportation unit includes an integrally molded bench seat and seat back that extend in a longitudinal direction of said truck.

6. A prisoner containment and transportation unit according claim 5, which includes support means secured to said bed of said truck, said bench seat resting on said support means.

7. A prisoner containment and transportation unit according to claim 5, wherein said prisoner containment and transportation unit includes a front wall that adjoins an end of said bench seat and seat back and faces a cab of said truck, said front wall being provided with window means to allow visual contact into said unit from said cab.

8. A prisoner containment and transportation unit according to claim 7, wherein said prisoner containment and transportation unit furthermore comprises a floor that rests upon said bed of said truck and adjoins said bench seat, a side wall that extends in said longitudinal direction of said truck and adjoins both said floor and said front wall, and a top that integrally interconnects said side wall, said front wall, and said seat back.

9. A prisoner containment and transportation unit according to claim 8, wherein said prisoner containment and transportation unit is a one-piece molded plastic insert comprised of said floor, said bench seat, said seat back, said front wall, said side wall, and said top, wherein said unit is open to the rear and when accommodated in said space defined by said truck bed and said shell is adapted to be closed off by said door.

10. A prisoner containment and transportation unit according to claim 8, wherein said prisoner containment and transportation unit is a two-piece molded plastic insert comprised of a top portion and a bottom portion that are adapted to be interconnected.

11. A prisoner containment and transportation unit according to claim 7, wherein an equipment compartment is disposed between said cab of said truck and said front wall of said prisoner containment and transportation unit.

12. A prisoner containment and transportation unit according to claim 3, wherein electromagnetic lock means are disposed between said hatchback door and said prisoner containment and transportation unit.

13. A prisoner containment and transportation unit according to claim 8, wherein a separate heating and ventilation system is provided for said unit.

14. A prisoner containment and transportation unit according to claim 8, wherein ductwork for heating and ventilation communicates with said unit, and wherein at least a portion of said ductwork is in the form of a contraband trap.

15. A prisoner containment and transportation unit according to claim 14, wherein rake means is provided to remove contraband from said ductwork.

* * * * *